US005184139A

United States Patent [19]

Hirako et al.

[11] Patent Number: 5,184,139

[45] Date of Patent: Feb. 2, 1993

[54] ANTENNA POINTING EQUIPMENT

[75] Inventors: Keiichi Hirako, Yokohama; Yoshihisa Kawaguchi, Tokyo, both of Japan

[73] Assignee: Kabushiki Kaisha Toshiba, Kawasaki, Japan

[21] Appl. No.: 750,602

[22] Filed: Aug. 27, 1991

[30] Foreign Application Priority Data

Aug. 29, 1990 [JP] Japan ................................ 2-229211
Aug. 29, 1990 [JP] Japan ................................ 2-229212

[51] Int. Cl.[5] .............................................. H04B 7/185

[52] U.S. Cl. .............................................. 342/354

[58] Field of Search ........................ 342/359, 354, 356

[56] References Cited

U.S. PATENT DOCUMENTS 5,043,737 8/1991 Dell-Imagine ...................... 342/359

*Primary Examiner*—Theodore M. Blum
*Attorney, Agent, or Firm*—Oblon, Spivak, McClelland, Maier & Neustadt

[57] ABSTRACT

An antenna pointing equipment of the present invention includes an error estimating section and a pointing angle correcting section. The error estimating section records the difference between a pointing mechanism angle detected by an angle detector and a reference angle estimated by a satellite position calculator, a pointing angle calculator and an angle estimating section in the tracking control mode and, for example, averages recorded differences to obtain a quantitative error of the estimated reference angle in the acquisition control mode. The pointing angle correcting section corrects the estimated reference angle for its error. The antenna pointing equipment also includes an area-impossible-to-track controller. The controller obtains an area which cannot be tracked by the antenna on the basis of orbital elements of a space navigation satellite and a target and forcible switches from the tracking control mode to the acquisition control mode when the target enters that area. In the acquisition control mode, the target direction at the time when the target goes out of that area is obtained and the reference angle of the antenna at that time is calculated.

8 Claims, 5 Drawing Sheets

ANTENNA POINTING EQUIPMENT

BACKGROUND OF THE INVENTION

1. Field of the Invention

The present invention relates to an antenna pointing equipment which, for inter-satellite communication between a geostationary satellite and a low earth orbit satellite, is adapted to point an antenna carried on one of the satellites to the other.

2. Description of the Related Art

In general, in transmission of mission data obtained by a low earth orbit satellite to an earth station or control command prepared by the earth station to the low earth orbit satellite, long-time communication is secured via the geostationary satellite. In order to permit communication between the geostationary satellite and the low earth orbit satellite, it is necessary that, in each of the satellites, its antenna be driven to track the other.

Usually, as shown in FIG. 1, a geostationary satellite A is placed in an geostationary orbit at a height of approximately 35,786 kilometers and moves in synchronism with the earth's rotation, while a low earth orbit satellite B such as an observatory satellite moves in a low earth orbit substantially from south to north and vice versa. The antenna pointing mechanism of an inter-satellite communication antenna B1 carried on the low earth orbit satellite B comprises an azimuth (Az) axis driving unit B2 and an elevation axis (E1) driving unit B3. The Az axis driving unit B2 rotates with its rotation axis pointed in the direction of the earth's center, while the E1 axis driving unit B3 rotates with its rotation axis parallel to the horizontal direction on the earth's surface. The antenna B1 is fixed to the E1 axis driving unit B3 and its direction is controlled by amounts of rotation of the units B1 and B2.

In implementation of intersatellite communication, when the low earth orbit satellite B comes into the field of view of the geostationary satellite A, the null axis of the antenna B1 is roughly directed to the geostationary satellite A in an acquisition control mode to acquire radio frequency beacon (signals or light) from the geostationary satellite. At the completion of the acquisition of radio frequency beacon, data communication is initiated and the operation is switched to a tracking control mode in which the antenna driving unit B3 is driven to track the geostationary satellite A until the strength of received signals or beacon is maximized.

The orbit of the low earth orbit satellite B varies from hour to hour as the earth rotates and thus, as shown in FIG. 2, the geostationary satellite A may pass through the neighborhood of the zenith (the point on the extension of the Az axis, which is referred to as the singular point) as seen from the low earth orbit satellite B. In such driving case, the Az driving unit B2 must be rotated at high speed in order to track the geostationary satellite A. However, in order to realize the Az driving unit B2 to such high-speed rotation, a large motor must be used, thus making the unit large and increasing power dissipation. This is not desirable for equipment which is to be carried on satellites.

From the above, with the conventional antenna pointing equipment carried on satellites, the portion indicated by oblique lines in FIG. 3 is regarded as an area impossible to track and, as soon as the geostationary satellite enters that area, the mode of operation is changed from the tracking control mode to the acquisition control mode, thereby acquiring radio frequency beacon again after the passage through the area. Under the present conditions, however, it takes a very long time to acquire the radio frequency beacon again. Communication becomes impossible while the radio frequency beacon is being acquired. Therefore, it is strongly desired that the accuracy of acquisition be improved and a period of time during which communication is impossible be shortened.

SUMMARY OF THE INVENTION

It is an object of the present invention to provide an antenna pointing equipment which is simple in construction and permits rapid recovery of tracking operation after passage through an area where it is impossible to track a target.

According to the present invention, there is provided an antenna pointing equipment for directing an antenna carried on a space navigation satellite to a target comprising:

pointing mechanism angle detecting block for detecting a pointing mechanism angle of the antenna;

reference angle estimating block for estimating a theoretical reference angle of the antenna on the basis of orbital elements of the space navigation satellite and the target;

error estimating block for obtaining an error of the theoretical reference angle from a difference between the pointing mechanism angle of the antenna detected by the pointing mechanism angle detecting block and the reference angle estimated by the reference angle estimating block;

correcting block for correcting the reference angle on the basis of the error obtained by the error estimating block;

acquisition control block for controlling the direction of the antenna on the basis of the reference angle corrected by the correcting block to acquire the target;

pointing error detecting block for detecting a pointing error of the antenna relative to the target in a state in which the target is acquired by the acquisition control block; and tracking control block for controlling the direction of the antenna so as to correct the pointing error obtained by said pointing error detecting block to thereby track the target.

Additional objects advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which is incorporated in and constitutes a part of the specification, illustrates a presently preferred embodiment of the invention and, together with the general description given above and the detailed description of the preferred embodiment given below, serves to explain the principles of the invention.

DETAILED DESCRIPTION OF THE PREFERRED EMBODIMENTS

Hereinafter, a preferred embodiment of the present invention will be described in detail with reference to FIG. 4.

Figure 4:
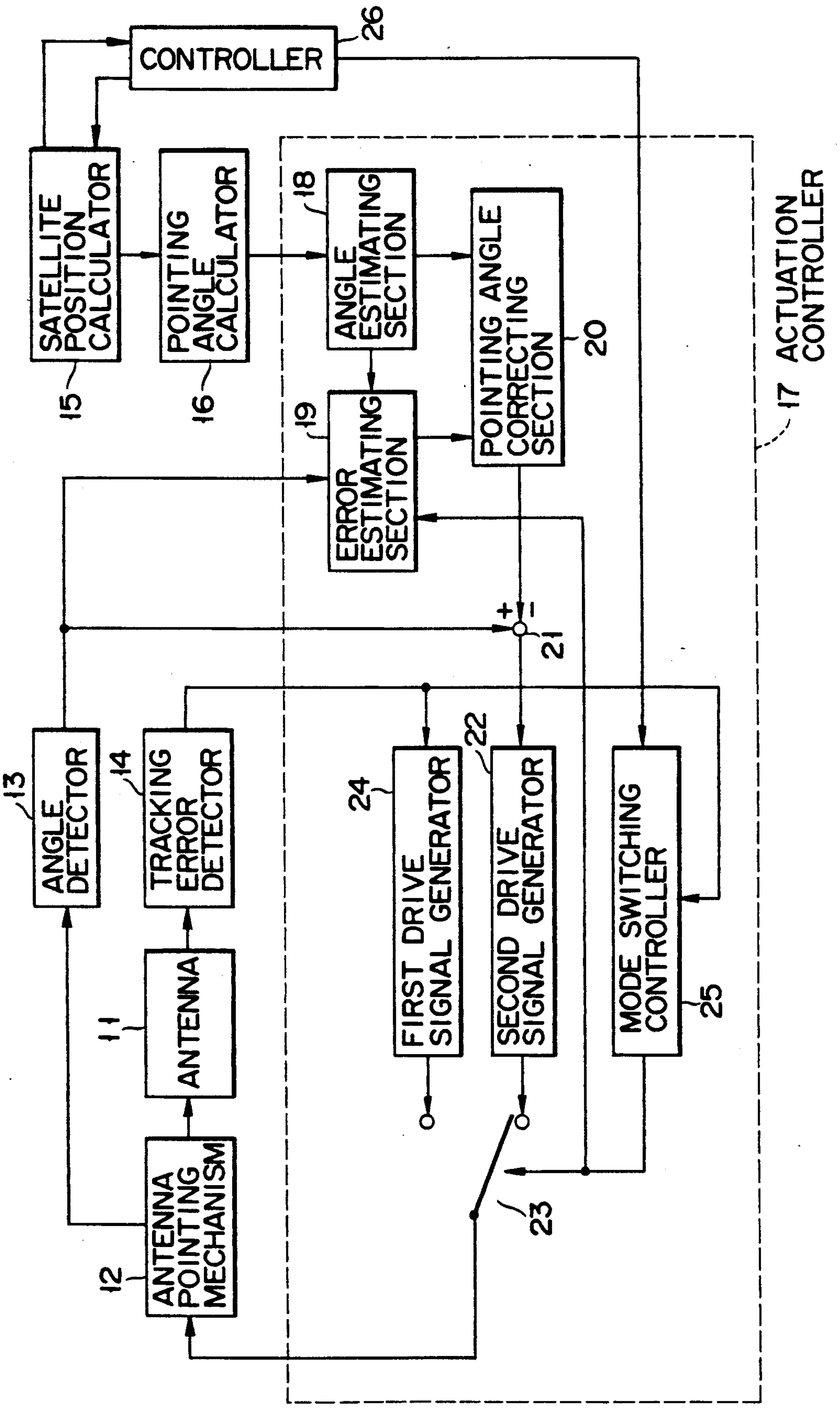
FIG. 4 is a block diagram of an antenna pointing equipment according to an embodiment of the present invention.

FIG. 4 illustrates an antenna pointing equipment of a low earth orbit satellite, in particular, according to the present invention. An antenna 11, which is carried on a low earth orbit satellite for communication with a geostationary satellite, is controlled by an antenna pointing mechanism 12 so as to be directed to the target satellite. The antenna pointing equipment is constructed, as described above, from an Az axis driving unit and an E1 axis driving unit. Each axis is actuated to rotate by a unit driving signal.

An angle detector 13 is adapted to detect a direction angle of the antenna 11 by detecting angles of rotation of the Az axis and E1 axis by the use of angle sensors each of which is mounted on its corresponding respective rotating axis of the pointing mechanism 12. Also, a tracking error detector 14 detects an error angle between the direction in which the antenna 11 points and the direction of the target, or the geostationary satellite by the use of a radio frequency sensor (a light sensor in the case of optical communications).

For example, a radio frequency sensor may be used as the tracking error detector 14 and comprises four RF sensor horns arranged symmetric to one another, with reference to an X-Y coordinate system arranged perpendicular to the direction in which the antenna 11 is directed and having an origin at the center of the symetric arrangement. The four sensor horns produce respective outputs S1–S4 which are subjected to signal processing. First, the squelch level $S_R$ is obtained as $$S_R = S_1 + S_2 + S_3 + S_4.$$

Then, the error angles $\theta_X$ and $\theta_Y$ with reference to the X and Y axes are calculated as $$\theta_X = \{(S_1+S_2)-(S_3+S_4)\}/S_R$$

$$\theta_Y = \{(S_1+S_4)-(S_2+S_3)\}/S_R$$

By means of this calculation, the error angle $\theta$, which represents how the antenna 11 is shifted from the target direction (in which a satellite exists), is obtained. The error angle $\theta$ can be obtained in the same way in the case where a light sensor having four quadrant detectors is employed.

Figure 5:
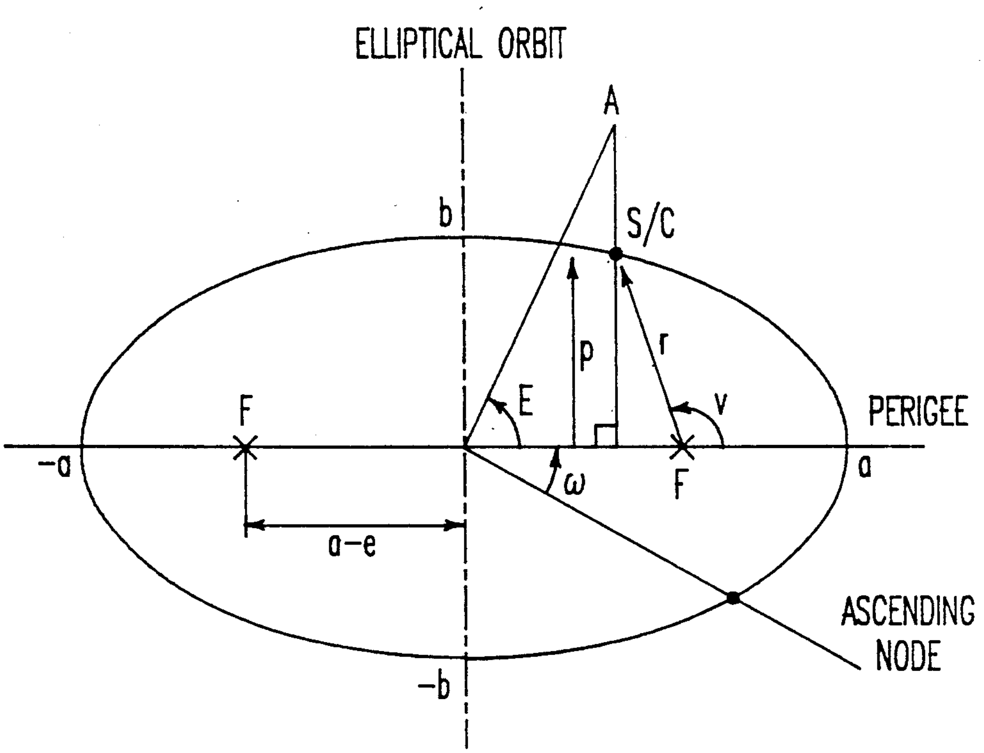
FIG. 5 is a diagram of an elliptical orbit of a satellite.
Figure 6:
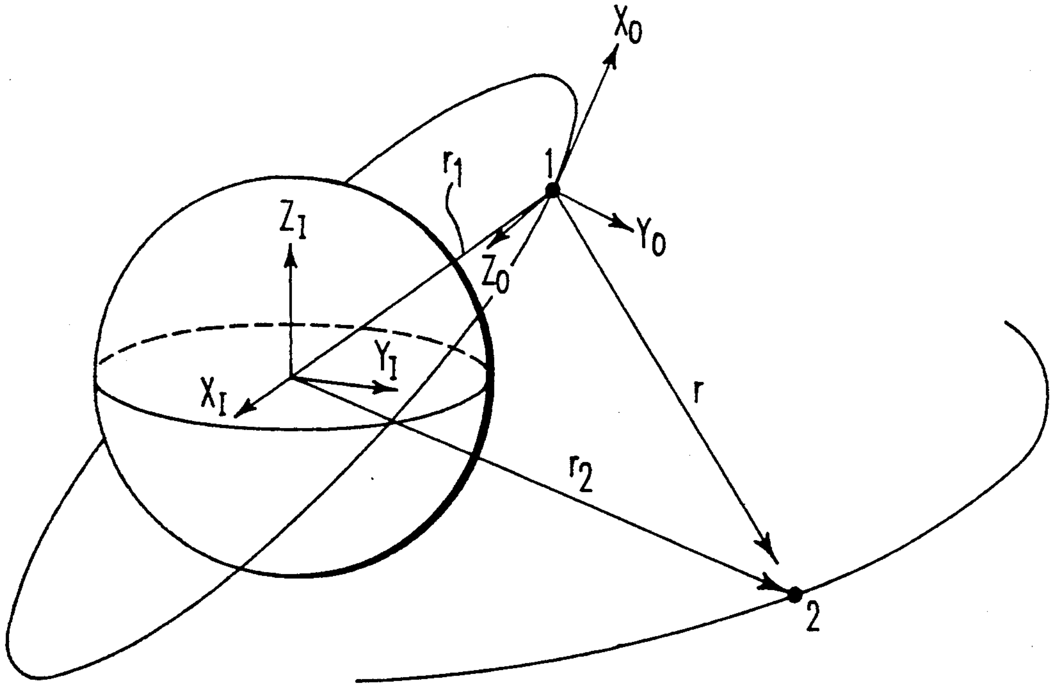
FIG. 6 is a diagram of the positional relationship between a satellite and earth.

A satellite position calculator 15 calculates the current positions of the low earth orbit satellite and the geostationary satellite on their orbits from information about their orbits which have been provided beforehand. Satellite position calculator will be described in relation to FIGS. 5 and 6. FIG. 5 shows an elliptical orbit of a geostationary satellite S/C. First, the average rate $\bar{n}_2$ of the geostationary satellite S/C is calculated as follows:

$$n_{02} = \sqrt{\frac{\mu}{a_2^3}}$$

$$P_2 = \frac{a_2}{Re}(1 - e_2^2)$$

$$\therefore \bar{n}_2 = n_{02} \cdot \left\{ 1 + \frac{3}{2} J_2 \frac{\sqrt{1 - e_2^2}}{P_2}\left(1 - \frac{3}{2}\sin i_2\right)\right\}$$

where:

a is the semimesurf axis,

Re is the mean equatorial radius of the earth (6378.142 km), $e_2$ is the eccentricity, $J_2$ is the coefficient of the earth's gravitational harmonics ($1.082628 \times 10^{-3}$, and $i_2$ is the inclination.

In an ideal case, $e_2$ and $i_2$ are both zero.

In addition, the ascending node recession rate $\Omega_2$ and the perigee argument variation rate $\omega$ are calculated according to the following formula:

$$\Omega_2 = -\frac{3}{2} \cdot J_2 \cdot \frac{1}{P_2^2} \cdot \bar{n}_2 \cdot \cos i_2$$

$$\omega_2 = \frac{3}{2} \cdot J_2 \cdot \frac{1}{P_2^2} \cdot n_2\left(2 - \frac{5}{2}\sin i_2\right)$$

The ascending node $\Omega_2$, the perigee $\omega_2$ and the mean anomaly $M_2$ are calculated according to the following formulas, respectively where $\Omega_{o2}$, $\omega_{o2}$ and $M_2$ are initial values.

$$\Omega_2 = \Omega_{02} + \int_0^t \dot{\Omega}_2\, dt$$

$$\omega_2 = \omega_{02} + \int_0^t \dot{\omega}_2\, dt$$

$$M_2 = M_{02} + \int_0^t \bar{n}_2\, dt.$$

Subsequently, the eccentric anomaly $E_2$ is calculated. Assuming that the number of times the calculation is repeated is denoted by i (=1, 2, ... ), the following formula is obtained:

$$E_{2,1} = E_{2,i-1} + \frac{M_2 + e_2 \sin(E_{2,i-1}) - E_{2,i-1}}{1 - e_2\cos(E_{2,i-1})}$$

By means of the calculation based on the above formula (calculation is repeated, with initial value $E_o$ being set equal to M), a value of convergence for ¢$E_{2,i}$" is obtained.

$$\sin V_2 = \frac{\sqrt{1 - e_2^2}\,\sin E_2}{1 - e_2\cos E_2}$$

-continued $$\cos \nu_2 = \frac{\cos E_2 - e_2}{1 - \cos E_2}$$

$$\therefore \nu_2 = \tan^{-1} \frac{\sqrt{1 - e_2^2}\ \sin E_2}{\cos E_2 - e_2}$$

The distance $r_2$ from the center of the earth to the satellite is calculated by the following formula:

$$r_2 = a_2(1 - E_2 \cos E_2)$$

Based on these calculation results, the axial components $r_{2X}$, $r_{2Y}$ and $R_{2Z}$ of the position vector $\vec{r}_2$, which represents the respective distances between the center of the earth and the geostationary satellite in an inertial coordinate-system (X, Y, Z), are calculated as follows:

$$r_{2X} = r_2 \{-\sin \Omega_2 \cos i_2 \sin (\omega_2 + E_2) + \cos \Omega_2 \cos (\omega_2 + E_2)\}$$

$$r_{2Y} = r_2 \{\cos \Omega_2 \cos i_2 \sin (\omega_2 + E_2) + \sin \Omega_2 \cos (\omega_2 + E_2)\}$$

$$r_{2Z} = r_2 \{\sin i_2 \cdot \sin (\omega_2 + E_2)\}$$

where $\vec{r}_2$ is expressed as follows:

$$\overline{r_2} = (r_2, r_{2Y}, r_{2Z})^T$$

Similarly, the position vector $\vec{r}_1$ of the low earth orbit satellite is calculated as given below according to the above formulas $$\overline{r_1} = (r_{1X}, r_{1Y}, r_{1Z})^T$$

The position information of the satellites thus obtained is sent to a pointing angle calculator 16, which calculates a pointing angle of the antenna 11 from the position information of the satellites. The direction/position vector $\vec{r}_{EU}$ from the low earth orbit satellite to the geostationary satellite represented in an inertial coordinate system is calculated as follows:

$$\overline{r_{EU}} = \overline{r_2} - \overline{r_1}$$

The direction/position vector $\vec{r}_{EU}$, thus calculated, is converted into data represented in the coordinate system of the low earth orbit satellite. Assuming that the coordinate transformation matrix from the inertial coordinate-system to the coordinate system of the low earth orbit satellite is A and that the result obtained by the coordinate transformation is $\vec{r}_{EUB}$, the following formula is obtained:

$$\vec{r}_{EUB} = A \cdot \vec{r}_{EU}$$

Hughes, *Spacecraft Attitude Dynamics* (John Wiley & Sons, Inc.) and general information regarding coordinate transformation is shown in Chapter 2 of James R. Wertz, "Spacecraft Attitude Determining and Control " *Astrophysics and Space Science Library*, Vol. 73, (D. Reidel Publishing Company). The pointing angle information thus obtained is sent to an angle estimating section 18 of an actuation controller 17.

The angle estimating section 18 calculates a pointing angle of each unit from the pointing angle information input thereto. The unit pointing angle information thus obtained is sent to an error estimating section 19 and a pointing angle generating section 20. More specifically, the angles $\theta_X$ and $\theta_Y$ for which the antenna 11 should be rotated around the X- and Y-axes, respectively, are calculated according to the following formulas:

$$\theta_X = \tan^{-1} \frac{-r_y}{\sqrt{r_x^2 + r_z^2}}$$

$$\theta_Y = \tan^{-1} \frac{r_x}{r_z}$$

where $r_{RUB} = (r_X, r_Y, r_Z)^T$ for which the antenna 11 is actually rotated. The angles detected by the angle detector 13 are compared with the angles $\theta_X$ and $\theta_Y$ calculated by the angle estimation section 18. By this comparison, the error estimation section 19 obtains error information $\theta_{XO}$ and $\theta_{YO}$ according to the following formulas:

$$\theta_{XO} = \theta_{XS} - \theta_X$$

$$\theta_{YO} = \theta_{XS} - \theta_Y$$

The angles $\theta_X$ and $\theta_Y$ calculated according to the above formulas are corrected in accordance with the error information $\theta_{XO}$ and. As a result of this correction, reference angles $\theta_{XR}$ and $\theta_{YR}$ (i.e., target values of angle control performed by the antenna pointing mechanism 12) are determined as follows:

$$\theta_{XR} = \theta_X + \theta_{XO}$$

$$\theta_{YR} = \theta_Y + \theta_{YO}.$$

The error estimating section 19 is responsive to a mode switching control signal output from a mode switching controller 25, which will be described later, to decide whether the mode of operation is the tracking control mode or the acquisition control mode. During the tracking control mode an error between the angle of rotation of each unit detected by the angle detector 13 and the pointing angle of the corresponding unit calculated by the angle estimating section 18 is obtained at regular intervals and recorded. During the acquisition control mode errors recording during the tracking control mode are, for example, averaged so as to estimate a quantitative error angle of the unit pointing angle calculated value. The error angle information is sent to a pointing angle correcting section 20.

The pointing angle correcting section 20 subtracts the error angle estimated by the error estimating section 19 from the unit pointing angle calculated by the angle estimating section 18, thereby correcting the pointing angle for each unit. This pointing angle signal is sent to a subtracter 21. The subtracter 21 subtract the unit rotation angle signal output from the angle detector 13 from the pointing angle signal output from the pointing angle correcting section 20 to produce a error angle signal. The error angle signal is sent to a second driving signal generator 22.

The second driving signal generator 22 generates a second driving signal corresponding to the input error angle signal. The driving signal is sent to the antenna pointing mechanism 12 via a mode switcher 23.

On the other hand, the signal indicating the error angle in the direction in which the antenna is pointed, which is obtained by the tracking error detector 14, is sent to a first driving signal generator 24, which generates a first driving signal for correcting the input error angle. The first driving signal is sent to the antenna pointing mechanism 12 via the mode switcher 23.

The tracking error detector 14 has a function of deciding whether the sensor output level is a reference level or above. The decision signal is sent to a mode switching controller 25. The mode switching controller 25, when the decision signal indicates that the sensor output level is below the reference level, switches the mode switcher 23 to select the second driving signal, so that the operation enters the acquisition control mode. When the sensor output level is the reference level or above, the mode switcher 23 is switched to select the first driving signal, so that the operation enters the tracking control mode.

The mode switching controller 25 is supplied with a switching control signal from a controller 26 for controlling an area impossible to track. The area-impossible-to-track controller 26 receives orbit information of each satellite from the satellite position calculator 15 and calculates the area which cannot be tracked by the low earth orbit satellite. The controller 26 then calculates the time when the geostationary satellite enters the area impossible to track and sends a switching control signal to the mode switching controller 25 at the calculated time. In response to the switching control signal from the controller 26, the mode switching controller 25 forcibly switches the mode switcher 23 to the acquisition control mode.

The controller 26 calculates the time when the geostationary satellite goes out of the area impossible to track simultaneously with outputting of the switching control signal. The time information is sent to the satellite position calculator 15. The satellite position calculator 15 calculates the position of each satellite on its orbit at that time immediately upon receipt of the time information from the area-impossible-to-track calculator 26 and sends it to the pointing angle calculator 16. After that time the regular operation is performed, so that the position of each satellite on its orbit at the current time is calculated.

The operation of the above system will be described below.

First, a description will be made of the process of directing of the antenna 11 to the geostationary satellite and tracking of it after the entry of the moving satellite into the field of view of the geostationary satellite.

In the initial state, the sensor output level of the tracking error detector 14 is below the reference level. Thus, the mode switcher 23 is in the acquisition control mode. Suppose now that the satellite position calculator 15 is commanded to direct the antenna to the geostationary satellite. Then, the satellite position calculator 15 calculates the positions of the low earth orbit satellite and the geostationary satellite on their orbits at the current time. Subsequently, the pointing angle calculator 16 calculates the pointing angle of the antenna 11 from the calculated positions of the satellites. The pointing angle information is sent to the angle estimating section 18 where the pointing angle of each unit in the pointing mechanism 12 is calculated. The pointing angle information of each unit thus obtained is sent to the error estimating section 19 and the pointing angle generator 20.

The error estimating section 19 decides that the system is in the acquisition control mode on the basis of the mode switching control signal output from the mode switching controller 25. Thus, the pointing angle information from the pointing angle calculator 16 is ignored, so that a quantitative error angle of the unit pointing angle calculated value is estimated from errors accumulated during the previous tracking control mode. The error angle information is sent to the pointing angle correcting section 20. Of course, if the system has not entered the tracking control mode before, the estimated value for the error angle is zero.

The pointing angle correcting section 20 subtracts the error angle estimated by the error estimating section 19 from the unit pointing angle calculated by the angle calculator 18, thereby correcting the pointing angle for each unit. The pointing angle signal is sent to the subtracter 21 where the unit current rotation angle obtained by the angle detector 13 is subtracted from the pointing angle to produce a error angle signal, which, in turn, is applied to the second drive signal generator 22.

The second drive signal generator 22 generates a second drive signal corresponding to the input corrected angle signal, which is applied to the antenna pointing mechanism 12 via the mode switcher 23. In the antenna pointing mechanism, each unit is turned to the direction of the pointing angle by the input second drive signal. Thereby, the antenna 11 is turned to the direction of the geostationary satellite. The angle of rotation of each unit is detected successively by the angle detector 13. Thus, the magnitude of the error angle signal output from the subtracter 21 becomes smaller as the unit rotation angle approaches the pointing angle.

In the tracking error detector 14, on the other hand, the magnitude of the sensor output becomes greater as the angle of rotation of the antenna 11 approaches its pointing angle. When the sensor output arrives at the reference level, or when the detector detects a signal representing lock-on, a mode switching signal is applied to the mode switching controller 25, so that it enters the tracking control mode. At the same time, an error angle of the antenna 11 is obtained from the sensor output, which, in turn, is applied to the first drive signal generator 24.

The first drive signal generator 24 generates a first drive signal for correcting the input error angle, which is applied to the antenna pointing mechanism 12 via the mode switcher 23. In the pointing mechanism, each unit is driven to rotate by the input first drive signal. Thus, the antenna 11 is driven so that the difference between its current direction angle and its target direction angle will always become 0°, thereby tracking the geostationary satellite.

Here, the mode switching control signal output from the mode switching controller 25 is also applied to the error estimating section 19. For this reason, the error estimating section 19 decides that the mode of operation has been switched to the tracking control mode and obtains and records an error between the unit rotation angle detected by the angle detector 13 and the unit pointing angle calculated by the angle estimating section 18 at regular intervals during the tracking control mode.

Figure 1:
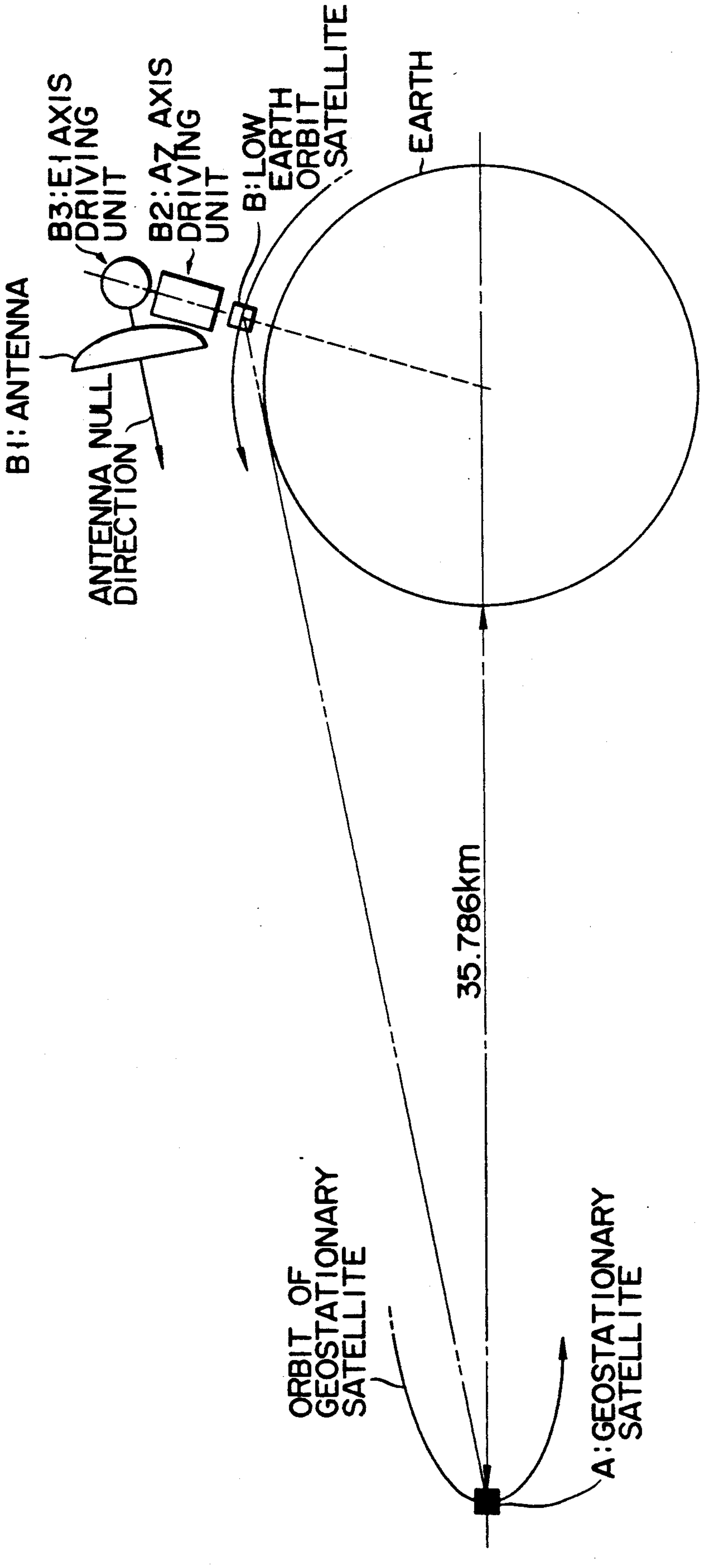
FIG. 1 (PRIOR ART)
FIG. 1 illustrates the positional relationship between a geostationary satellite and a low earth orbit satellite for intersatellite communication.
Figure 2:
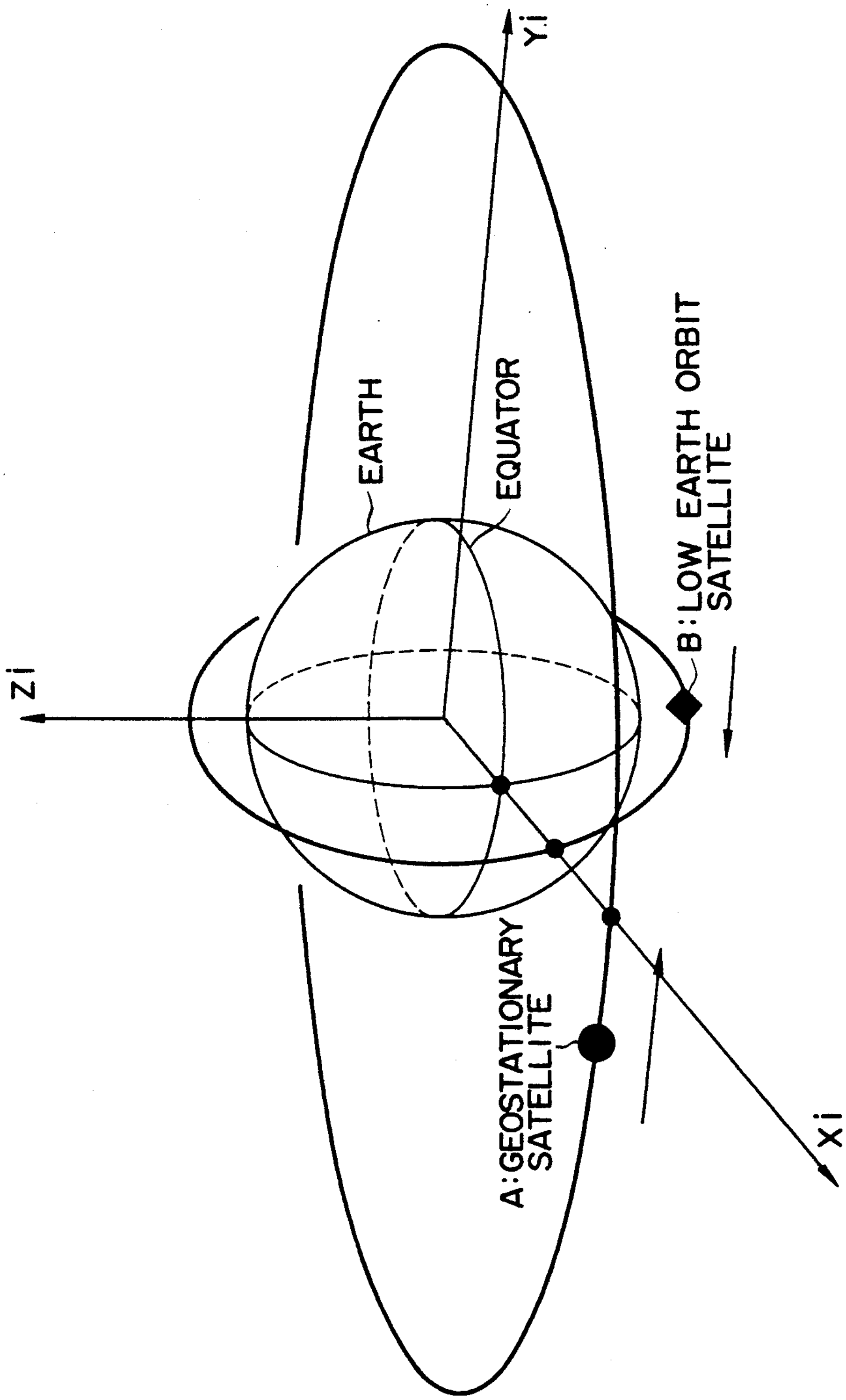
FIG. 2 (PRIOR ART)
FIG. 2 is a diagram illustrating a state in which the geostationary satellite passes right over the low earth orbit satellite.

Next, a description will be made of the operation in the case where the geostationary satellite passes through the neighborhood of the singular point of the low earth orbit satellite in the tracking control mode as shown in FIG. 2.

Figure 3:
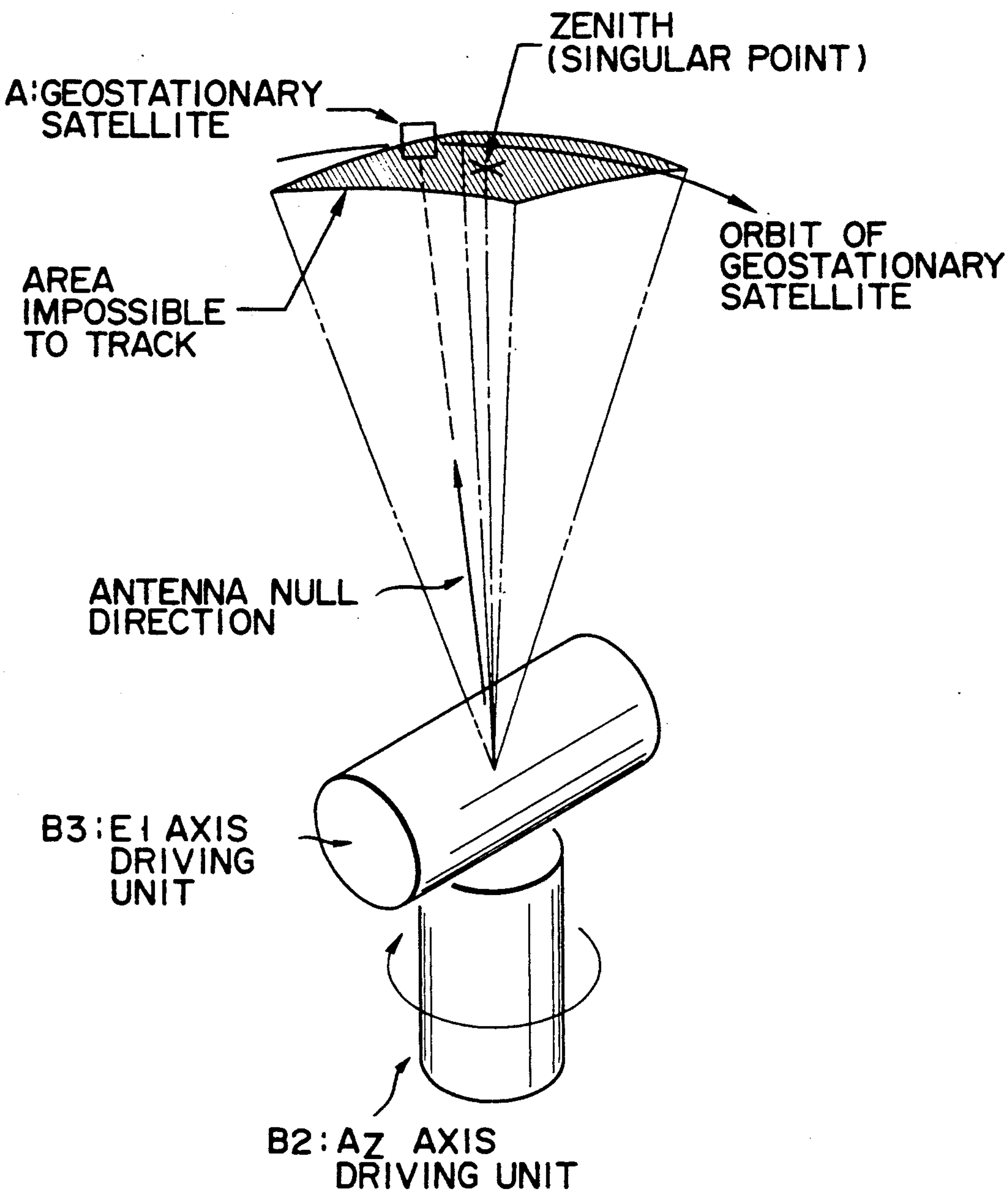
FIG. 3 (PRIOR ART)
FIG. 3 illustrates an area which cannot be tracked by an antenna pointing equipment.

In the neighborhood of the singular point, the Az axis driving unit of the antenna pointing equipment 12 becomes unable to respond to the drive signal, so that the antenna becomes unable to track the geostationary satellite. Since the area impossible to track is determined as illustrated in FIG. 3, the entry of the geostationary satellite into this area can be found beforehand on the basis of the positional relationship between the satellites.

In the present embodiment, therefore, the area-impossible-to-track controller 26 receives orbit information of each satellite from the satellite position calculator 15, calculates the area impossible to track near the singular point and predicts the first time when the geostationary satellite enters that area and the second time when the geostationary satellite goes out of that area. When the first time arrives, a switching control signal is sent to the mode switching controller 25, so that the mode switcher 23 is switched to the tracking control mode by force. Further, when the first second time arrives, the time information is sent to the satellite position calculator 15, whereby the position of each satellite at the second time is calculated.

That is, as soon as the geostationary satellite enters the area impossible to track, the position from where the geostationary satellite goes out of that area is calculated and the reference angle and the unit pointing angle at that time are calculated by the pointing angle calculator 16 and the angle estimating section 18. Having decided, at this point, that the mode of operation is the acquisition control mode on the basis of the mode switching control signal output from the mode switching controller 25, the error estimating section 19 estimates an error angle of a pointing angle calculated value from errors which have been accumulated during the tracking control mode, which is sent to the pointing angle correcting section 20 to thereby correct the unit pointing angle.

For this reason, the antenna 11 is quickly directed to the position from where the geostationary satellite goes out of the area impossible to track under the direct control of the acquisition control loop and enters the standby state, independently of the rotation limit of the unit and the actuating speed of the pointing mechanism 12.

When the geostationary satellite goes out of the area impossible to track, the sensor output reaches the reference level in the tracking error detector 14. Thus, the mode of operation is switched to the tracking control mode at about the same time the geostationary satellite goes out of the area impossible to track, thereby permitting the antenna 11 to track the geostationary satellite.

Therefore, the antenna pointing equipment of the present invention can accurately acquire and track the geostationary satellite when it goes out of the area impossible to track because it is constructed, as described above, such that the mode of operation is switched from the tracking control mode to the acquisition control mode at the same time the geostationary satellite enters that area, the position from where the geostationary satellite goes out of that area is calculated immediately, the antenna is directed to the direction of that position and moreover an error of calculation is corrected. Thereby, the time from when it becomes impossible to track the geostationary satellite in the neighborhood of the singular point until it is acquired again, that is, the time during which communication is impossible can be shortened.

The antenna pointing equipment for the geostationary satellite, which has no singular point but performs the tracking control and acquisition control like that for the low earth orbit satellite, can be realized by the same arrangement as in FIG. 4 except the area-impossible-to-track calculator 26. In this case, the accuracy of direction control in the acquisition control is improved by the error estimating section 19, thus permitting the low earth orbit satellite to be acquired in a short time. In the antenna pointing equipment according to the present embodiment, the error estimating section 19 and the pointing angle correcting section 20 may be omitted if the reference angle and the unit pointing angle, in particular, are calculated with a high accuracy and thus the correction thereof is unnecessary. It is apparent that other embodiments and modifications are possible.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An antenna pointing equipment for directing an antenna carried on a space navigation satellite to a target comprising:

pointing mechanism angle detecting means for detecting a pointing mechanism angle of said antenna;

reference angle estimating means for estimating a theoretical reference angle of said antenna on the basis of orbital elements of said space navigation satellite and said target;

error estimating means for obtaining an error of said theoretical reference angle from a difference between said pointing mechanism angle of said antenna detected by said pointing mechanism angle detecting means and said reference angle estimated by said reference angle estimating means;

correcting means for correcting said reference angle on the basis of said error obtained by said error estimating means;

acquisition control means for controlling the direction of said antenna on the basis of said reference angle corrected by said correcting means to acquire said target;

pointing error detecting means for detecting a pointing error of said antenna relative to said target in a state in which said target is acquired by said acquisition control means; and tracking control means for controlling the direction of said antenna so as to correct said pointing error obtained by said pointing error detecting means to thereby track said target.

2. An antenna pointing equipment according to claim 1, further comprising switching control means for switching between the target acquisition state when said direction error cannot be detected by said direction error detecting means and a target tracking state when said direction error can be detected.

3. An antenna pointing records according to claim 1, in which said error estimating means records the difference between the antenna pointing mechanism angle detected by said pointing mechanism angle detecting means and the reference angle estimated by said reference angle estimating means during a target tracking state and obtains a quantitative error of the estimated reference angle from the recorded difference during a target acquisition state.

4. An antenna pointing equipment according to claim 1, further comprising area-impossible-to-track control means for obtaining an area which cannot be tracked by said antenna on the basis of the orbital elements of said space navigation satellite and said target and forcibly switching from the tracking control state to the acquisition control state when said target enters that area.

5. An antenna pointing equipment according to claim 4, in which said reference angle estimating means obtains the direction of said target when it goes out of said area and estimates a reference angle of said antenna in the acquisition control state.

6. An antenna pointing equipment for directing an antenna carried on a space navigation satellite to a target comprising:

pointing mechanism angle detecting means for detecting a direction angle of said antenna;

reference angle calculating means for calculating a reference angle of said antenna on the basis of orbital elements of said space navigation satellite and said target;

acquisition control means for controlling the direction of said antenna so that said pointing mechanism angle detected by said pointing mechanism angle detecting means may agree with said reference angle obtained by said reference angle calculating means to thereby acquire said target;

pointing error detecting means for detecting a pointing error of said antenna relative to said target in a state in which said target is acquired by said acquisition control means;

tracking control means for controlling the direction of said antenna so as to correct said pointing error obtained by said pointing error detecting means to thereby track said target; and area-impossible-to-track control means for obtaining an area which cannot be tracked by said antenna on the basis of the orbital elements of said space navigation satellite and said target and forcibly switching from a tracking control state to an acquisition control state when said target enters that area.

7. An antenna pointing equipment according to claim 5, further comprising switching control means for switching between the target acquisition state when said pointing error cannot be detected by said pointing error pointing means and a target tracking state when said pointing error can be detected.

8. An antenna pointing equipment according to claim 5, in which said reference angle calculating means obtains the direction of said target when it goes out of said area and calculates a reference angle of said antenna in the acquisition control state.

* * * * *